United States Patent Office 2,831,863
Patented Apr. 22, 1958

2,831,863

DI-(N-ALKYL-3-PIPERIDYLOXY) ALKANES AND SALTS THEREOF

John H. Biel, Milwaukee, Wis., assignor to Lakeside Laboratories, Inc., a corporation of Wisconsin No Drawing. Application February 28, 1956
Serial No. 568,189

6 Claims. (Cl. 260—294.7)

This invention relates to di-(N-alkyl-3-piperidyloxy) alkanes, and salts thereof.

This application is a continuation-in-part of my application Serial No. 389,843, filed November 2, 1953, now abandoned.

I have discovered and synthesized a group of new and superior anti-spasmodic compounds which act as ganglionic or other type blocking agents to relieve the spasms of skeletal muscles. The therapeutic action of these compounds is analogous to curare. The di-(N-alkyl-3-piperidyloxy) alkanes have the following structural formula:

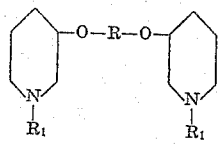

wherein R is an alkylene group, including lower and higher alkylene groups and preferably those having 2 to 20 carbons, and $R_1$ is an alkyl group, including lower and higher alkyl groups and preferably those having 1 to 20 carbons, or an aralkylene radical, and preferably aralkylene radicals in which the alkylene moiety is a lower alkylene and the aryl moiety is a monocyclic group. The salts of the above compounds have the following structural formula:

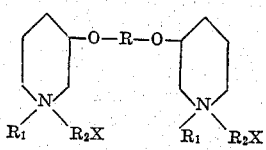

wherein R and $R_1$ have the significance previously assigned, $R_2$ is hydrogen or an alkyl radical, preferably a lower alkyl, and X is the negative ion of a non-toxic acid. By a non-toxic acid, I mean one that is non-toxic when given in therapeutic dosages.

It is to be noted that the salts may be acid addition or quaternary ammonium salts. Such salts are generally soluble in water. Therefore, they constitute a preferred form of the invention.

Salts of the compounds which comprise this invention may be prepared by reacting the basic di-(N-alkyl-3-piperidyloxy) alkanes with non-toxic acids or the esters thereof. Examples of the salts that may be prepared include halide, sulfate, phosphate, tartrate, benzoate, acetate, cinnamate, mandelate, maleate, succinate, citrate and the like.

In preparing the new compounds of this invention, two moles of an alkali metal salt of N-alkyl-3-piperidinol are condensed with a dibromoalkane in boiling toluene or xylene. The basic diether is reacted with an alkyl halide to form the quaternary ammonium salt.

Examples of the new compounds and their preparation are as follows:

Example 1

A. Di-1,5, (N-methyl-3-piperidyl) pentyl ether dimethobromide, having the following structural formula:

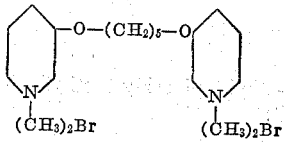

To 34.5 g. (0.30 mole) of N-methyl-3-hydroxypiperidine in 300 cc. of toluene was added 11.7 g. (0.30 mole) of potassium metal. The mixture was stirred and refluxed for four hours and 34.5 g. (0.15 mole) of 1,5-dibromopentane in 50 cc. of toluene were then added dropwise with stirring. The solution was stirred and refluxed for sixteen hours, clarified by filtration and the filtrate distilled. The product was collected at 153–155° C. at 0.05 mm.; yield 9.5 g. (21%).

Analysis.—Calcd. for $C_{17}H_{34}N_2O_2$: N, 9.40. Found: N, 9.17.

To 9.0 g. (0.03 mole) of the ether base in 25 cc. of isopropyl alcohol was added 7.5 g. (0.074 mole) of $CH_3Br$. The mixture was allowed to stand at room temperature for four days. The dibromide was precipitated by the addition of anhydrous ether to the alcoholic solution, collected by filtration and the solid immediately recrystallized from 75 cc. of isopropyl alcohol. The precipitate was filtered and washed with a mixture of isopropyl alcohol-acetone; yield 3.3 g., M. P. 186–187° C.

Analysis.—Calcd. for $C_{19}H_{40}Br_2N_2O$: Br−, 32.80; N, 5.74. Found: Br−, 32.76; N, 5.80.

Other new compounds prepared by essentially the same method as set forth in Example 1, but in which the appropriate dihaloalkanes were employed, have the following structural formulae:

B. Di-1,2-(N-n-butyl-3-piperidyl)-ethyl ether and its dimethobromide salt:

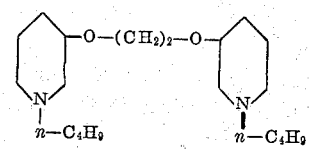

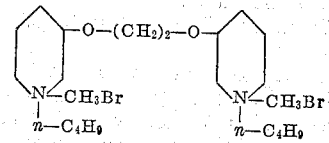

C. Di-1,2-(N-isopropyl-3-piperidyl) ethyl ether and its diethobromide salt:

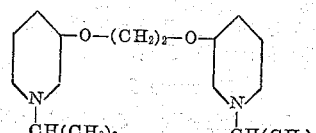

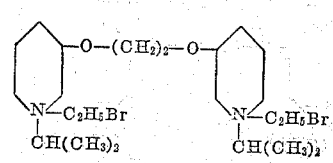

D. Di-1,2-(N-benzyl-3-piperidyl) ethyl ether and its dimethobromide salt:

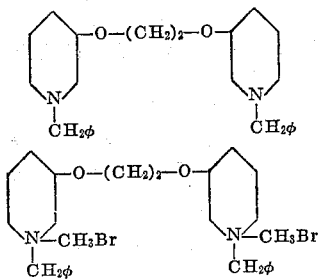

E. Di-1,2-(N-ethyl-3-piperidyl) ethyl ether and its diethobromide salt:

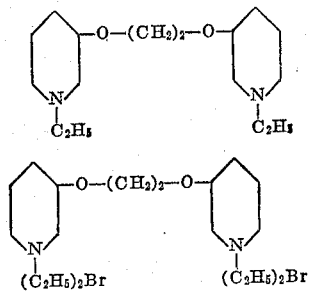

F. Di - 1,2 - (N - 8' - phenyloctyl - 3 - piperidyl) ethyl ether and its dimethobromide salt:

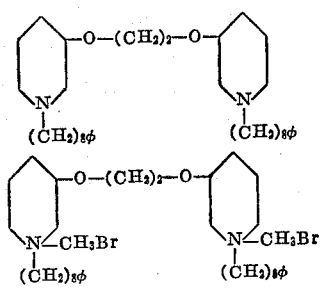

*Example 2*

Di-1,6-(N-methyl-3-piperidyl) hexyl ether dimethobromide, having the following structural formula:

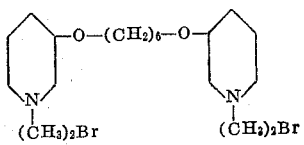

This compound was obtained in the same manner as the preceding pentylether. The basic ether was collected at 150–158° C. (0.30 mm.).

*Analysis.*—Calcd. for $C_{18}H_{36}N_2O_2$: N, 8.97. Found: N, 8.95.

To 7.0 g. (0.022 mole) of the base in 25 cc. of isopropyl alcohol was added 4.2 g. (0.044 mole) of methyl bromide. The solution was allowed to stand at room temperature for several days and then poured into 300 cc. of anhydrous ether. An oil precipitated which on rubbing under fresh anhydrous ether yielded a crystalline, hygroscopic solid, M. P. 174° C. dec.

*Analysis.*—Calcd. for $C_{20}H_{42}Br_2N_2O_2$: Br, 31.90; N, 5.57. Found: Br, 31.80; N, 5.57.

*Example 3*

Di-1,10-(N-methyl-3-piperidyl) decyl ether dimethobromide, having the following structural formula:

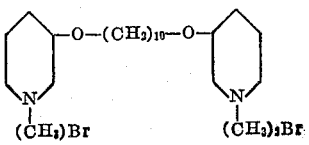

A mixture of 23 g. (0.20 mole) of N-methyl-3-hydroxy-piperidine and 7.8 g. (0.20 mole) of potassium metal in 100 cc. dry toluene was stirred and refluxed for three hours. The suspension was allowed to cool and 25 g. (0.083 mole) of 1,10-dibromodecane in 50 cc. of toluene added. The reaction mixture was allowed to stir and reflux for twenty hours, clarified by filtration and the filtrate extracted with dilute aqueous hydrochloric acid. The aqueous acid extract was made strongly alkaline with solid potassium hydroxide, the alkaline solution extracted with ether and the ether extract dried with potassium carbonate. The ether was removed by distillation and the product collected at 180–186° C. (0.20 mm.); yield 10 g.

*Analysis.*—Calcd. for $C_{22}H_{44}N_2O_2$: N, 7.62. Found: N, 7.39.

To 1.84 g. (0.005 mole) of the basic ether in 15 cc. of acetone was added 1.0 g. (0.01 mole) of $CH_3Br$. A white crystalline solid precipitated immediately. It was collected by filtration and washed with acetone, M. P. 210° C. dec.

*Analysis.*—Calcd. for $C_{24}H_{50}Br_2N_2O_2$: Br⁻, 28.68; N, 5.02. Found: Br⁻, 28.58; N, 5.15.

*Example 4*

Di-1,2-(N-methyl-3-piperidyloxy)-ethane and its dibenzylbromide salt, having the following structural formula:

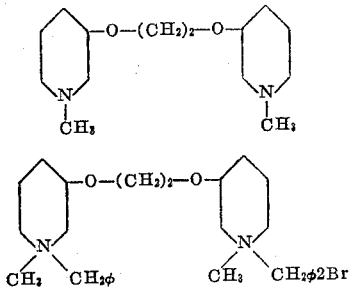

In a 500 ml. 3 necked round bottomed flask equipped with mechanical stirrer, reflux condenser with potassium hydroxide drying tube, dropping funnel, thermometer, and mantle place 12.4 g. (0.2 mole) anhydrous ethylene glycol in 150 ml. anhydrous dioxane. Add slowly 15.6 g. (0.4 mole) metallic potassium at 60–70° C. Stir at reflux temperature one hour, then add dropwise with stirring 53.3 g. (0.4 mole) N-methyl-3-chloro-piperidine and stir and reflux for twenty-four hours. Filter off potassium chloride and extract filtrate three times with 100 ml. portions of a solution of 60 ml. concentrated hydrochloric acid in 250 ml. water. Combine acid aqueous extracts, make strongly alkaline with solid potassium hydroxide with cooling, extract three times with ethyl ether, combine extracts and dry first over potassium hydroxide, then over anhydrous potassium carbonate and fractionally distill through a 2 inch column. b=127–131° (0.18 mm.); 9.0 g.; 17.6% yield.

*Analysis.*—Calcd. for $C_{14}H_{28}N_2O_2$: N, 10.95; N, 10.76 (found).

2.0 g. (0.0078 mole) di-(N-methyl-3-piperidyloxy)-ethane, 2.67 g. (0.0156 mole) benzyl bromide and 15 ml. anhydrous isopropanol were mixed and allowed to stand on top of the oven. The solution was rubbed under anhydrous ethyl ether and the white precipitate collected by anhydrous filtration, triturated under anhydrous ethyl ether, filtered and dried. M. P. 58–99° (d.); 4.82 g.; 100% yield. (Extremely hygroscopic.)

*Analysis.*—Calcd. for $C_{28}H_{42}Br_2N_2O_2$: Br, 26.75; N, 4.68. Found: Br, 26.79; N, 4.59.

*Example 5*

Di-1,12-(N-methyl - 3 - piperidyloxy)-dodecane and its dimethobromide salt, having the following structural formulae:

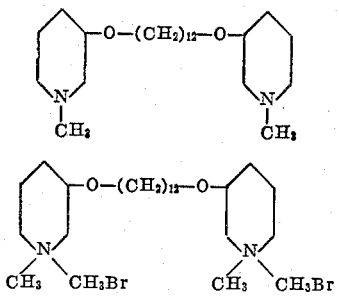

The basic ether was formed in a manner analogous to Example 3. The product was collected at 209–213° C. (0.05 mm.).

Analysis.—Calcd. for $C_{24}H_{48}N_2O_2$: N, 7.09. Found: N, 7.09.

The base was converted to its dimethobromide salt in the usual manner, M. P. 224–226° C.

Analysis.—Calcd. for $C_{26}H_{54}N_2O_2Br_2$: Br, 27.28; N, 4.78. Found: Br, 27.08; N, 4.95.

*Example 6*

Di-1,14-(N-methyl-3-piperidyloxy)-tetradecane and its dimethobromide salt, having the following formulae:

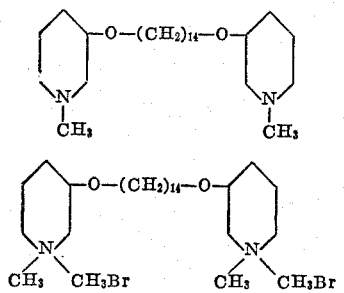

The basic ether was formed in a manner analogous to Example 3; B. P. 238–239° C. (0.04 mm.).

Analysis.—Calcd. for $C_{26}H_{52}N_2O_2$: N, 6.54. Found: N, 6.60.

The base was converted to its dimethobromide salt in the usual manner, M. P. 235–237° C.

Analysis.—Calcd. for $C_{28}H_{58}Br_2N_2O_2$: Br, 26.52; N, 4.55. Found: Br, 26.03; N, 4.95.

*Example 7*

The following bases as well as their dimethobromides were also prepared by the identical procedures set forth in the previous examples but in which the appropriate dibromoalkanes were employed.

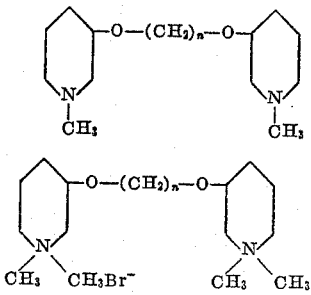

The melting points of the dimethobromide salts and their assays are given below:

| n | M. P., °C. | Br Calcd. | Br Found | N Calcd. | N Found |
|---|---|---|---|---|---|
| 4 | 160–163 | 33.50 | 33.72 | 5.73 | 5.91 |
| 7 | 164–168 | 30.73 | 30.98 | 5.51 | 5.43 |
| 8 | 200–202 | 29.90 | 30.17 | 5.47 | 5.28 |

It is to be noted the acid addition salts of the compounds of this invention may be formed by adding an inorganic or organic acid to the basic diether instead of reacting the basic diether with an alkyl halide.

Having described my invention as related to the embodiments herein, it is my intention that the invention be not limited by any of the details of description, but rather be construed broadly within its spirit and scope as set out in the accompanying claims.

What is claimed is:

1. A member of the group consisting of compounds of the formula

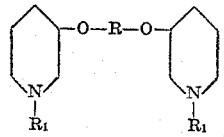

wherein R is an alkylene group of 2 to 20 carbons, and $R_1$ is a member of the group consisting of lower alkyl groups and aralkylene groups in which the aryl group is monocyclic and the alkylene group is a lower alkylene; and acid addition and quaternary ammonium salts thereof.

2. Di-1,12-(N-methyl-3-piperidyloxy)-dodecane.
3. Di-1,14-(N-methyl-3-piperidyloxy)-tetradecane.
4. Di-1,2-(N-methyl-3-piperidyloxy)-ethane.
5. Di-1,10(N-methyl-3-piperidyloxy)-decane.
6. Di-1,6-(N-methyl-3-piperidyloxy)-hexane.

No references cited.